Patented Jan. 8, 1952

2,581,508

UNITED STATES PATENT OFFICE 2,581,508

TREATMENT OF OXIDIZED HYDROCARBON MIXTURES AND PRODUCTS THEREOF

Carl N. Zellner, Berkeley Heights, and Fred Lister, Elizabeth, N. J., assignors to Tide Water Associated Oil Company, Bayonne, N. J., a corporation of Delaware No Drawing. Application September 13, 1949, Serial No. 115,558

20 Claims. (Cl. 260—485)

The present invention relates to a method for treatment of certain oxidized hydrocarbon mixtures and products resulting from such treatment thereof.

In the oxidation of hydrocarbons by liquid phase oxidation with oxygen of a free oxygen-containing gas, complex oxidized hydrocarbon mixtures are obtained that comprise a wide variety of oxidized products, the exact nature of which appears to be primarily dependent upon the particular conditions employed for the oxidation. For example, by employing certain conditions in accordance with certain prior art disclosures for effecting the oxidation, oxidized hydrocarbon mixtures may be obtained that have relatively low saponification values, e. g., less than about 400 mgs. of KOH per gram and, hence, contain a substantial amount of monofunctional substances, e. g. monobasic acids, with a negligible amount, if any, of crystalline difunctional substances. On the other hand, and as is described more fully hereinafter, by varying the conditions under which the oxidation is eeffcted, oxidized hydrocarbon mixtures may be obtained that have relatively high saponification values, e. g., at least about 400 mgs. of KOH per gram and substantially higher, e. g., on the order of 500 to 625 or more. Such oxidized hydrocarbon mixtures contain, in addition to monofunctional substances, a substantial amount of crystalline difunctional substances, e. g., dibasic acids, and substances convertible thereto, the attainment of such relatively high saponification values being effective to convert a substantial amount of the hydrocarbons to polyfunctional in preference to monofunctional substances. Generally speaking, such oxidized hydrocarbon mixtures, prepared by liquid phase oxidation of hydrocarbons by reaction thereof with oxygen of a free-oxygen containing gas, and particularly when the oxidation is continued to relatively high saponification values, are characterized by having an acid value substantially lower than the saponification value and, in many instances, the difference between the acid and saponification values often represents about 40% of the saponification value.

In copending application Serial No. 625,961 (now U. S. Patent No. 2,486,454), filed October 31, 1945, of which one of us is the inventor, a method, and products resulting therefrom, has been described for treatment of hydrocarbons in liquid phase under controlled conditions by reaction of the hydrocarbons with oxygen of a free oxygen-containing gas. An important aspect of the invention disclosed therein is that, by use of the conditions disclosed, suppression of resinification is obtained both at the low as well as at the higher stages of oxidation. Suppression of resinification at the early stages of oxidation is important in that it not only enables preparation of crude oxidation mixtures with minimized formation of resinous materials at various stages of the oxidation but, of considerable importance, enables continuance of the oxidation to relatively high saponification values, e. g., over 400, whereby oxidized hydrocarbon mixtures may be prepared that contain a substantial amount of dibasic acids and polyfunctional substances convertible thereto. In one illustration, the process of the aforesaid copending application comprises contacting hydrocarbons in liquid phase with a gas containing free oxygen at an oxidizing temperature while controlling the rate of feed of the gas to the hydrocarbons and the gas distribution therein to maintain dispersed in the hydrocarbons an amount of gas sufficient to cause combination of oxygen at an average rate related to the oxidizing temperature as follows: substantially above 1.5 liters of oxygen per hour per kilogram of hydrocarbons at an oxidizing temperature of 120° C., substantially above 23 liters of oxygen per hour per kilogram of hydrocarbons at an oxidizing temperature of 160° C., and substantially above 135 liters of oxygen per hour per kilogram of hydrocarbons at an oxidizing temperature of 180° C.

Oxidized hydrocarbon mixtures, prepared in the manner disclosed in the aforesaid copending application, are characterized by having a substantial difference between the acid and the saponification value, the components accounting for the differential being largely composed of partially oxidized hydrocarbons of complex chemical structure. Due to the presence of the stated partially oxidized substances largely accounting for the difference between the acid and saponification values of oxidized hydrocarbon mixtures prepared in accordance with the method of the aforesaid application, such crude oxidized hydrocarbon mixtures present certain problems, as for example, with respect to recovery of desirable constituents thereof. In illustration, reference is made to copending applications Serial No. 668,317 (now U. S. Patent No. 2,486,455), filed May 8, 1946, and Serial No. 769,761 (now U. S. Patent No. 2,486,456), filed August 20, 1947, of which one of us is the inventor, disclosing thermal and catalytic treatments for such crude oxidized hydrocarbons to effect improved recovery of crystalline dibasic acids by suppressing the effect of the intermediately oxidized hydrocarbons to inhibit recovery of crystalline polyfunctional components from the crude oxidized mixture.

Investigations directed to the use of oxidized hydrocarbon mixtures of the type disclosed in and prepared by the method set forth in copending application Serial No. 625,961 (now U. S. Patent No. 2,486,454), for recovery of certain desirable constituents thereof has revealed that such oxidized hydrocarbon mixtures perform in an unexpected manner. Since such oxidized hydrocarbon mixtures contain a substantial concentration of saponifiable constituents, consisting of both the compounds that account for the acid value as well as compounds that account for the difference between the acid and saponification value, it is highly desirable to treat such oxidized hydrocarbons to recover saponifiable equivalents therefrom in highly useful form and in a simple and economic manner. Resort has therefore been made to use of conventional distillation in an attempt to recover the saponifiable value of such oxidized hydrocarbon mixtures in distillate form but such attempts have revealed that the amount of saponifiable constituents in the recoverable distillate or distillates totals substantially less than the saponifiable value of the crude oxidized mixture subjected to the distillation. In specific illustration thereof, an oxidized hydrocarbon mixture, prepared by oxidizing a scale wax (105 to 108° F. melting point) in the manner disclosed in copending application Serial No. 625,961 (now U. S. Patent No. 2,486,454), and having an acid value of 408.8 and a saponification value of 632.8, was subjected to distillation and the results obtained are set forth in Table I. In that table, the figures of 94.9% shown as the weight yield (based on the weight of the oxidized hydrocarbon charge) and the 68.5% shown as the weight of saponifiable equivalents recovered in the distillate includes 3.1% (by weight of charge) of an aqueous acidic solution recovered as distillate in a Dry Ice trap employed in carrying out the distillation, said acidic solution containing 3% of saponifiable equivalents based on the saponifiable equivalents in the charge.

type disclosed in and prepared by the method set forth in copending application Serial No. 625,961 (now U. S. Patent No. 2,486,454), present a problem for recovery therefrom, in high yields, of the desirable saponifiable equivalents present in such mixtures.

In our copending application, Serial No. 107,138, filed July 27, 1949, a method has been disclosed for treatment of oxidized hydrocarbon mixtures, of the type disclosed and prepared in the manner set forth in copending application Serial No. 625,961 (now U. S. Patent No. 2,486,454), to improve the susceptibility of such oxidized hydrocarbon mixtures to distillation with improved recovery, in desired distillate form, of saponifiable equivalents present in the oxidized mixture. Briefly, the process disclosed therein comprises reacting such crude oxidized hydrocarbon mixtures with an organic compound containing a hydroxyl group possessing alcoholic characteristics to effect combination of saponifiable groups in the oxidized hydrocarbon mixture with an amount of the hydroxyl-bearing compound equivalent to at least a portion, based on the acid value, of the oxidized hydrocarbon mixture. As in the invention described in copending application Serial No. 107,138, the present invention embodies, for use as starting materials, oxidized hydrocarbon mixtures of the type disclosed in and prepared by the method set forth in copending application Serial No. 625,961 (now U. S. Patent No. 2,486,454). Furthermore, and similar to the invention disclosed in Serial No. 107,138, the present invention relates to treatment of such crude oxidized hydrocarbon mixtures to improve the susceptibility thereof to distillation with improved recovery, in desirable distillate form, of saponifiable equivalents present in the oxidized hydrocarbon mixture. Moreover, and as in the method set forth in Serial No. 107,138, the present invention is directed to treatment of the oxidized hydrocarbon mixture by reaction thereof with a suitable hydroxyl-bearing compound but differs therefrom in that, in accordance with the present invention, the reaction is carried out in the presence of a suitable catalyst, use of which provides certain additional advantages which will be apparent from the more detailed description of the invention set forth hereinafter.

Broadly speaking, the present invention comprises an improved method for reacting a crude oxidized hydrocarbon mixture, as aforedescribed, with a suitable organic compound (containing a hydroxyl group possessing alcoholic characteristics) in the presence of a suitable catalyst to

*Table I*

| Run No. | Total yield | | Distillate yields | | | | | | Bottoms (by Weight based on Charge) |
|---|---|---|---|---|---|---|---|---|---|
| | | | Fraction up to 100° C. at 0.2 mm. pressure—Acid Value=333.7; Sap. Value=610.4 | | Fraction from 100–175° C. at 1.0 mm. pressure—Acid Value=632.8; Sap. Value=739.2 | | Fraction from 175–197° C. at 1 to 3.2 mm. pressure—Acid Value=459.2; Sap. Value=652.4 | | |
| | Per Cent by Weight of Charge Recovered as Distillates and Bottoms | Per Cent of Saponifiable Equivalents in Distillates based on Saponifiable Equivalents in Charge | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | |
| 1 | 94.9 | 68.5 | 14.6 | 10.5 | 23.6 | 27.6 | 26.7 | 27.4 | 26.9% (hard, brittle mass at 280° C. and 3.2 mm. pressure). |

The data in the foregoing table shows that by subjecting the crude oxidized hydrocarbon mixture to distillation, 94.9% of the charge (by weight) was recovered, the 94.9% recovery being the sum of the distillates obtained plus the bottoms product (26.8%) which was a hard, brittle mass. Such a substantial amount of bottoms product was formed even though the distillation, carried out to a bottoms temperature of 280° C. at 3.2 mm. pressure, was not sufficient to effect decomposition as, during the distillation, no evidence of substantial, if any, evolution of carbon dioxide was observed. However, and although the total products recovered amounted to 94.9% of the charge, the saponifiable equivalents of the charge were recovered in desired distillate form in an amount of only 68.5% based on the saponifiable equivalents content of the oxidized hydrocarbon charge subjected to the distillation. It is clear, therefore, as evidenced by the foregoing data, that oxidized hydrocarbon mixtures of the promote combination between said oxidized hydrocarbon mixture and said hydroxyl-bearing compound, and products of such a method. Although the invention broadly contemplates use of hydroxyl-containing compounds as aforesaid, particularly suitable compounds are monohydroxyl-containing compounds, illustrations of which include alcohols, and, more particularly, aliphatic alcohols such as ethanol, methanol, butanol, 2-ethylhexanol, octanol, and the like. Hence, in the more detailed discussion of the invention set forth hereinafter, such alcohols have been employed for illustrative, but not limitative, purposes. In illustration, the method of this invention comprises reacting the crude oxidized hydrocarbon with a suitable hydroxyl-containing compound as aforesaid in the presence of a suitable catalyst, the hydroxyl-bearing compound being employed in an amount in excess of the theoretical equivalent based on the acid value of the oxidized hydrocarbon mixture. In preferred form, the invention embodies use in the reaction of an amount of the hydroxyl-bearing compound substantially in excess of the theoretical equivalent based on the extent to which it is desired to effect combination with saponifiable groups of the oxidized hydrocarbon mixture, and in more preferred form, the amount of the hydroxyl-bearing compound employed is at least equal to, or in excess of, the theoretical equivalent based on the saponifiable value of the oxidized hydrocarbon mixture. The reaction between the oxidized hydrocarbon mixture and the hydroxyl-bearing compound to obtain the results embodied herein may suitably be effected over a rather wide temperature range, as for example, from about 60° C. to about 250° C. or even higher, such as on the order of 275° C. or other temperatures as long as, for the particular oxidized hydrocarbon employed, the reaction temperature does not exceed that at which incipient or substantial decomposition of the oxidized hydrocarbon occurs. Although such higher temperatures may, in some instances, be desirably employed, usage thereof is not generally deemed essential as highly suitable results may be obtained by use of lower temperatures, as for example, about 80° C. to about 220° C. and the temperatures set forth in the examples set forth hereinafter showing suitable embodiments of this invention. As is set forth more fully hereinafter, it has been found that by subjecting such oxidized hydrocarbon mixtures to treatment with a hydroxyl-bearing compound (as aforedefined) in the presence of a suitable catalyst, combination of the hydroxyl-bearing compound may be effected to an extent in excess of the theoretical equivalent based on the acid value to produce products characterized by having an improved susceptibility to treatment by distillation, as compared to the oxidized hydrocarbon mixture per se, and to effect an improvement in recovery of saponifiable equivalents from the oxidized hydrocarbon mixture, thereby representing a marked improvement in the utilization of such oxidized hydrocarbon mixtures for recovery, particularly in highly desired distillate form, of the saponifiable equivalents thereof. As an important aspect of this invention, the use of a catalyst enables the obtainment of decided advantages in promoting or enhancing continued reaction of the oxidized hydrocarbons with the hydroxyl-bearing compounds in amount in excess of the theoretical equivalent based upon the acid value of the oxidized hydrocarbons. That use of the catalyst provides such results is clearly unexpected and is particularly so when it is considered, as is discussed more fully hereinafter, that such results are not as readily obtained in absence of the catalyst.

In order to further describe the invention, several examples are set forth hereinafter presenting data which, when compared with the results set forth for run No. 1 (Table I) clearly evidence the markedly improved results obtained by practice of this invention. As in run No. 1, no evidence of substantial, if any, carbon dioxide formation was observed in any of the examples set forth hereinafter during distillation of the products formed by reaction between the oxidized hydrocarbon mixtures and the hydroxyl-bearing compound, thus illustrating that the highly improved results obtained by practicing this invention were not obtained at the expense of effecting decomposition as would be indicated by carbon dioxide formation. In the data set forth in Tables II to VII, the total yield by weight of charge recovered as distillate and bottoms is based on the charge to distillation of the alcohol reacted oxidized hydrocarbon and the total yield of saponifiable equivalents in the distillates and bottoms is based on the saponifiable equivalents of the oxidized hydrocarbon mixture subjected to the alcohol treatment.

An oxidized hydrocarbon mixture, identical to that used in Table I, was mixed with an amount of butanol double the theoretical equivalent based on the saponification value of the oxidized hydrocarbon mixture and 10% (based on the weight of said oxidized hydrocarbon mixture) of concentrated sulfuric acid. The resulting mixture was heated for 10 hours at 90° to 103° C. and then at 124 to 133° C. for 3½ hours with continuous withdrawal of water formed during the reaction. Analysis of the reaction product (run No. 2) obtained therefrom showed that the oxidized hydrocarbon mixture had combined with an amount of the alcohol equivalent to 139% based on the acid value of the oxidized hydrocarbon mixtures. Upon subjecting the reaction product to distillation, the following results were obtained (Table II):

*Table II*

| Run No. | Total yield | | Distillate yields | | | | Bottoms (% by Weight based on Charge) |
| --- | --- | --- | --- | --- | --- | --- | --- |
| | | | Fraction up to 170° C. at 0.1 to 0.5 mm. pressure—Acid Value=9.5; Sap. Value=392.0 | | Fraction from 170 to 232° C. at 1.2 to 5.0 mm. pressure—Acid Value=15.1; Sap. Value=391.0 | | |
| | Per Cent by Weight of Charge recovered as Distillate and Bottoms | Per Cent of Saponifiable Equivalents in Distillates (based on Saponifiable Equivalents in Charge) | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | |
| 2 | 88.0 | 83.5 | 66.8 | 67.2 | 14.9 | 16.3 | 6.4 (a hard brittle mass at 350° C. and 5.0 mm. pressure). |

An oxidized hydrocarbon mixture, identical to that used in Table I, was mixed with an amount of butanol double the theoretical equivalent based on the saponification value of the oxidized hydrocarbon mixture. The mixture was heated for 6 hours at 86 to 93° C. during which gaseous HCl was bubbled through the reacting mixture with continuous withdrawal of water formed during the reaction. Analysis of the reaction product showed that the oxidized hydrocarbon mixture had combined with an amount of alcohol equal to 118% based on the equivalent of the acid value of the oxidized hydrocarbon mixture. Distillation of the reaction product (run No. 3) gave the results set forth in Table III. A portion of the same reaction product was further heated at 132 to 152° C. for 9 hours (run No. 4) with continuous withdrawal of water formed and analysis of the resulting product showed that the oxidized hydrocarbon had combined with an amount of butanol equal to 129% of the theoretical amount based on the equivalent of the acid value of the oxidized hydrocarbon mixture. Distillation of the product of run No. 4 gave the results set forth in Table III.

As another illustration, an oxidized hydrocarbon mixture, as used in Table I, was mixed with an amount of butanol double the theoretical equivalent based on the saponification value of the oxidized hydrocarbon and with 2% (by weight of said oxidized mixture) of boron trifluoride etherate. The mixture thus prepared was heated at 90 to 100° C. for 10 hours and then at 137 to 163° C. for 6 hours with continuous withdrawal of water formed during the reaction. The reacted mixture, upon analysis, showed that alcohol combination had been effected to the extent of 140% of the equivalent based on the acid value of the oxidized hydrocarbon mixture. Upon distillation, the reaction product (run No. 5) gave the results set forth in Table IV.

Table IV

| | Total yields | | Distillate yields | | | | | | |
| | | | Fraction up 150° C. at 0.1 mm. pressure—Acid Value=16.2; Sap. Value=421 | | Fraction from 150-170° C. at 0.1-2.0 mm. pressure—Acid Value=4.5; Sap. Value=419 | | Fraction from 170-225° C. at 0.2-5.0 mm. pressure—Acid Value=3.9; Sap. Value=386 | | |
| Run No. | Per Cent by Weight of Charge Recovered as Distillates and Bottoms | Per Cent of Saponifiable Equivalents in Distillates (based on Saponifiable Equivalents in oxidized hydrocarbon Charge) | Per Cent by Weight of Charge | Per Cent of Saponifiable Equivalents (based on aponifiable Equivalents in Charge) | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | Bottoms (Per Cent by Weight based on Charge) |
| 5 | 89.2 | 83.7 | 36.7 | 41.0 | 12.4 | 13.7 | 28.5 | 29.0 | 11.6 (hard brittle mass). |

In still another illustration, an oxidized hydrocarbon mixture as used in Table I was mixed with 2-ethylhexanol in an amount double the theoretical equivalent based on the saponification value of the oxidized hydrocarbon mixture and the resulting mixture was heated for 10 hours at 140 to 160° C. with continuous withdrawal of water formed during the reaction. The thus treated mixture was then mixed with 10% (by weight of the oxidized hydrocarbon) of concentrated sulfuric acid and heated for 10 hours at 100 to 140°

Table III

| | Total yields | | Distillate yields | | | | | | |
| | | | Fraction up to 170° C. at 0.1 mm. pressure—Acid Value=9.0; Sap. Value=414 | | Fraction from 150-170° C. at 0.2 mm. pressure—Acid Value=12.5; Sap. Value=406 | | Fraction from 170-220° C. at 0.6-2.0 mm. pressure—Acid Value=46.6; Sap. Value=400 | | |
| Run No. | Per Cent by Weight of Charge Recovered as Distillates plus Bottoms | Per Cent of Saponifiable Equivalents in Distillates plus Bottoms (based on Saponifiable Equivalents in Charge) | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | Bottoms (Per Cent by Weight based on Charge) |
| 3 | 94.5 | 91.2 | 62.8 | 61.4 | | | 20.5 | 20.1 | 11.2 (at 300° C. and 4 mm. pressure) containing 9.7% of Saponifiable Equivalents of Charge. |
| | | In Distillates only | Fraction up to 150° C. at 0.2 mm. pressure—Acid Value=15.1; Sap. Value=426. | | | | Fraction from 170-230° C. at 0.6-2.0 mm. pressure—Acid Value=65.4; Sap. Value=408. | | |
| 4 | 92.7 | 87.0 | 61.5 | 62.8 | 12.2 | 12.0 | 12.0 | 12.2 | 7.0 (at 340° C. and 2 mm. pressure). |

C. with continuous withdrawal of water formed during the reaction. Analysis of the reaction product (run No. 6) showed that combination of alcohol had occurred to the extent of 126.0% based on the theoretical equivalent of the acid value of the oxidized hydrocarbon. The reaction product, upon being subjected to distillation, gave the following results (Table V):

Table V

| Run No. | Total yields | | Distillate yields | | | | | | Bottoms (Per Cent by Weight based on Charge) |
|---|---|---|---|---|---|---|---|---|---|
| | Percent by Weight of Charge Recovered as Distillates and Bottoms | Per Cent of Saponfiable Equivalents in Distillates plus Bottoms (based on Saponifiable Equivalents in Charge) | Fraction up to 150° C. at 0.1 mm. pressure—Acid Value=0.3; Sap. Value=296 | | Fraction from 150–170° C. at 0.1 mm. pressure—Acid Value=0.3; Sap. Value=274 | | Fraction from 170–230° C. at 0.8-1.5 mm. pressure—Acid Value=11.2; Sap. Value=252 | | |
| | | | Per Cent by Weight of Charge | Per Cent of Saponfiable Equivalents (based on Saponfiable Equivalents in Charge) | Per Cent by Weight of Charge | Per Cent of Saponfiable Equivalents (based on Saponfiable Equivalents in Charge) | Per Cent by Weight of Charge | Per Cent of Saponfiable Equivalents (based on Saponfiable Equivalents in Charge) | |
| 6 | 96.3 | 89.9 | 11.2 | 11.3 | 43.2 | 41.5 | 29.8 | 25.7 | 12.1 (326° C. at 1.5 mm. containing 10.4 Per Cent of Saponfiable Equivalents in Charge). |

An oxidized hydrocarbon mixture, as used in Table I, was mixed with 10% by weight of "Zeo-Karb H" and an amount of butanol double the theoretical equivalent based on the saponification value of the oxidized hydrocarbon, "Zeo-Karb H" being an ion-exchange catalyst known to the art and understood to comprise carbon treated with sulfuric acid. The resulting mixture was heated for 12 hours at 140 to 150° C. with continuous withdrawal of water formed during the reaction. Analysis of the reaction product showed that alcohol combination had been effected to the extent of 128.5% of the equivalent based on the acid value of the oxidized hydrocarbon mixture. Distillation of the reaction product (run No. 7) gave the results set forth in Table VI:

Table VI

| Run No. | Total yields | | Distillate yields | | | | | | Bottoms (Per Cent by Weight based on Charge) |
|---|---|---|---|---|---|---|---|---|---|
| | Per Cent by Weight of Charge Recovered as Distillates and Bottoms | Per Cent of Saponifiable Equivalents in Distillates (based on Saponifiable Equivalents in Charge) | Fraction up to 120° C. at 1.5-0.1 mm. pressure—Acid Value=5.8; Sap. Value=361 | | Fraction from 120–170° C. at 0.2 mm. pressure—Acid Value=6.2; Sap. Value=418 | | Fraction from 170–240° C. at 0.2-4.0 mm. pressure—Acid Value=9.0; Sap. Value=404 | | |
| | | | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | Per Cent by Weight of Charge | Per Cent of Saponifiable Equivalents (based on Saponifiable Equivalents in Charge) | |
| 7 | 89.7 | 79.0 | 28.8 | 27.9 | 30.0 | 33.6 | 20.6 | 17.5 | 10.3 (at 320° C. and 4 mm. pressure). |

An oxidized hydrocarbon mixture as used in Table I was mixed with an amount of butanol double the theoretical equivalent based on the saponification value of the oxidized hydrocarbon mixture and 10% by weight of concentrated sulfuric acid. The resulting mixture was heated for 5 hours at 110 to 120° C. with continuous withdrawal of water formed during the reaction. Upon analysis, the reaction product (run No. 8) showed that alcohol combination had been effected to the extent of 135% based on the theoretical equivalent of the acid value of the oxidized hydrocarbon mixture. Distillation of the reaction product gave the results set forth in Table VII.

Table VII

| Run No. | Total yields | | Distillate yields | | | | | | Bottoms (per cent by Weight based on Charge) |
|---|---|---|---|---|---|---|---|---|---|
| | Percent by Weight of Charge Recovered as Distillates and Bottoms | Per cent of Saponifiable Equivalents in Distillates plus Bottoms (based on Saponifiable Equivalents in Charge) | Fraction up to 150° C. at 0.2 mm. pressure—Acid Value=5.0; Sap. Value=452 | | Fraction from 150–170° C. at 0.2 mm. pressure—Acid Value=4.6; Sap. Value=424 | | Fraction from 170–234° C. at 0.2-5.0 mm. pressure—Acid value=33.6; Sap. Value=389 | | |
| | | | Per cent by Weight of Charge | Per cent of Saponifiable Equivalents (based on Saponifiable Equivalents in Charge) | Per cent by Weight of Charge | Per cent of Saponifiable Equivalents (based on Saponifiable Equivalents in Charge) | Per Cent by Weight of Charge | Per cent of Saponifiable Equivalents (based on Saponifiable Equivalents in Charge) | |
| 8 | 86.3 | 89.4 | 49.3 | 52.8 | 12.9 | 13.4 | 16.5 | 15.7 | 7.6 (at 332° C. and 5 mm. pressure; containing 7.5 per cent of saponifiable equivalents based on saponifiable equivalents in Charge). |

An oxidized hydrocarbon mixture as used in Table I was mixed with 2-ethylhexanol in an amount double the theoretical equivalent based on the saponification value of the oxidized hydrocarbon and heated at 154 to 211° C. for 18 hours with continuous withdrawal of water formed. The reacted mixture was then mixed with 0.5% by weight (based on the oxidized hydrocarbon) of zinc chloride and heated for 7 hours at 208 to 212° C. with periodic withdrawal of water formed. Analysis of the thus treated product showed that alcohol combination had been effected to the extent of 118.5% of the theoretical equivalent based on the acid value of the oxidized hydrocarbon mixture. In still another example, an oxidized hydrocarbon mixture, prepared by oxidizing scale wax (105 to 108° F. melting point) in the manner set forth in copending application Serial No. 625,961 (now U. S. Patent No. 2,486,454) and having an acid value of 369.6 and saponification value of 588.0 was mixed with an amount of 2-ethylhexanol double the theoretical equivalent based on the saponification value and with 0.5% (by weight of the oxidized hydrocarbon) of toluene sulfonic acid. The resulting mixture was heated for 4 hours at 145 to 200° C. with continuous withdrawal of water formed. Analysis of the reaction product showed that alcohol combination was effected to the extent of 123.0% of the theoretical equivalent based on the acid value of the oxidized hydrocarbon mixture. Similarly to the results set forth with respect to the examples set forth in the foregoing tables, the aforesaid reaction products prepared with use of zinc chloride or toluene sulfonic acid, respectively, as catalysts provided alcohol reacted products which, upon distillation, gave improved yields of saponifiable equivalents in the form of distillates as compared to the distillates recoverable by distillation of the oxidized hydrocarbon mixtures per se without use of an alcohol treatment as embodied herein.

In summary of the specific illustrations set forth in the foregoing tables, the runs therein are, for purposes of convenience, set forth in the following tabulation to provide a ready comparison evidencing the highly improved results obtained by practicing this invention. In the following tabulation, it is evident by comparison of the 68.5% yield of saponifiable equivalents obtainable as distillates in run No. 1 with the saponifiable yields in distillates obtainable from run Nos. 2 to 8, inclusive, that practice of the present invention improves the susceptibility of the oxidized hydrocarbon mixtures to distillation with markedly improved yields of saponifiable equivalents in highly desirable distillate form thereby representing a marked improvement in the utilization of such oxidized hydrocarbon mixtures for recovery of saponifiable constituents thereof.

| Run No. | Charge to Distillation | Catalyst | Amount of Alcohol Combined (Equivalent based on Acid Value of Oxidized Hydrocarbon Mixture) | Percent of Saponifiable Equivalents in Distillates based on Saponifiable Equivalents in Chg. (Bottoms excluded) |
|---|---|---|---|---|
| 1 | Oxidized hydrocarbon mixtures per se | None | None | 68.5 |
| 2 | Butanol treated oxidized hydrocarbon mixture | $H_2SO_4$ | 139% | 83.5 |
| 3 | Butanol treated oxidized mixture | HCl | 118% | 81.5 |
| 4 | ----do---- | ----do---- | 120% | 87.0 |
| 5 | ----do---- | Boron trifluoride etherate | 140% | 83.7 |
| 6 | 2-ethylhexanol treated oxidized hydrocarbon mixture | $H_2SO_4$ | 126% | 79.5 |
| 7 | Butanol treated oxidized hydrocarbon mixture | "ZeoKarb H" | 128.5% | 79.0 |
| 8 | ----do---- | $H_2SO_4$ | 135% | 81.9 |

As is apparent from the foregoing illustrations, the markedly improved results embodied by practice of this invention are obtainable by use of a variety of catalytic materials including inorganic and organic acids, such as sulfuric acid, hydrochloric acid, and toluene sulfonic acid, ion exchange catalysts, e. g., "ZeoKarb H," and other catalytic substances such as boron trifluoride etherate, and zinc chloride. Although such catalysts have been set forth as specific illustrations in describing the invention, other substances including metal oxides such as alumina, silica, mixtures thereof, etc. may be employed during the treatment of the oxidized hydrocarbon as aforedefined. Hence, in broad aspect the present invention embodies the use of a catalyst that performs satisfactorily to enhance combination of the hydroxyl-bearing compound with an amount of saponifiable groups in the oxidized hydrocarbon mixture in excess of the theoretical equivalent based on the acid value. Since substances included in the aforesaid illustrations are known catalysts for esterification reactions, and perform satisfactorily in practice of this invention, it is apparent that the present invention also contemplates use of esterification catalysts capable of causing reaction between the oxidized hydrocarbon mixture and hydroxyl-bearing compounds to occur to such an extent. In preferred embodiment, however, acidic substances possessing the desired catalytic properties are employed, illustrations thereof being the acidic catalysts set forth and used in the foregoing examples.

As aforesaid, a particularly important aspect of the present invention is based on the discovery that by use of a catalyst as aforediscussed, reaction of the oxidized hydrocarbons may be more readily effected to the extent of combining with an amount of the hydroxyl-bearing compound in excess of the theoretical equivalent based on the acid value whereby saponifiable groups that are not readily combinable are combined with the hydroxyl-bearing compound to provide reaction products that contain saponifiable groups combined with the hydroxyl-bearing compound, in admixture with saponifiable groups that are not so combined, the amount of saponifiable groups thus combined being in excess of the saponifiable groups accounting for the acid value of the oxidized hydrocarbon mixture subjected to the treatment of this invention. That such ease of combination may be effected is clearly an unexpected result, particularly when it is considered that same is effected without need of pretreating the oxidized hydrocarbon mixture for removal of certain saponifiable or unsaponifiable constituents prior to reaction with the hydroxyl-bearing compound. This is further surprising inasmuch as, in the absence of a catalyst, the oxidized hydrocarbon mixtures, as embodied for use herein and which contain saponifiable groups giving an acid value in admixture with saponifiable groups that account for the difference between acid and saponifiable value, show a marked resistance to combining with an amount of the hydroxyl-bearing compound in excess of the theoretical equivalent based on the acid value. Not only does the use of a catalyst facilitate such extensive combination but, additionally, generally enables the attainment thereof at lower temperatures and/or shorter reaction periods than treatment of the oxidized hydrocarbon in the absence of a catalyst and although, even by use of higher temperature and longer reaction periods in the absence of the catalyst, combination is not generally, if at all, effected past the acid value of the oxidized hydrocarbon.

As is apparent from the foregoing, and as compared to the oxidized hydrocarbon mixtures per se, treatment of such mixtures in accordance with this invention not only improves the susceptibility of such mixtures for treatment by distillation with improved recovery of saponifiable equivalents in desirable distillate form, but, of considerable importance, use of a catalyst in some manner facilitates combination of a suitable hydroxyl-bearing compound with saponifiable groups in an amount substantially in excess of the theoretical equivalent based on the acid value. Thus, by practice of this invention, combination is readily effected with free acid groups as well as with a substantial portion of saponifiable groups that are not in free acid form, the latter groups accounting for the difference between the acid and saponification value of the oxidized hydrocarbon mixture. As aforesaid, attainment of combination to such an extent is clearly unexpected and is especially so when it is considered that by practice of this invention such combination occurs even though the crude oxidized hydrocarbon mixtures subjected to treatment contain saponifiable groups (accounting for the difference between acid and saponification value) that offer a marked resistance to combining with a hydroxyl-bearing compound containing a hydroxyl group possessing alcoholic characteristics. Thus, the results obtained by practice of this invention, and using oxidized hydrocarbon mixtures as aforedefined, are clearly unexpected and are not predictable from prior art knowledge of which we are aware relating to reactions (e. g., such as esterification) of alcoholic substances with acids, including acids separated out of oxidized hydrocarbon mixtures, and which are devoid of or do not contain substantial amounts of intermediately oxidized compounds that account for a difference between an acid and saponification value and which offer a marked resistance to combining with alcoholic substances. However, by use of a catalyst in the treatment disclosed herein, an unexpected function is provided in that during the reaction certain constituents of the oxidized hydrocarbon mixture are in some manner altered whereby certain of the saponifiable compounds that offer a marked resistance to combining with an alcoholic compound are converted to a combinable form resulting in increased yields of desired reaction products.

The reaction products obtained by treatment of oxidized hydrocarbon mixtures in accordance with this invention are, as far as we are aware, novel compositions having utility for many purposes. In particular, the reaction products, and distillates obtainable therefrom, such as the reaction products and distillates disclosed hereinbefore, are highly useful as organic solvents, as intermediates for preparation of chemical derivatives of the constituents of the reaction products and distillates therefrom, and as addition agents for substances such as synthetic resins for plasticizing and other purposes.

Although the present invention has been described in conjunction with certain preferred embodiments thereof, those skilled in the art will readily recognize that variations and modifications can be made. Such variations and modifications are to be considered to be within the purview of the specification and the scope of the appended claims.

We claim:
1. An improved method for treatment of an oxidized hydrocarbon mixture, as defined hereinafter, to promote combination between a substantial portion of the saponifiable groups accounting for the difference between the acid and saponification value with an organic compound containing a hydroxyl group possessing alcoholic characteristics, said oxidized hydrocarbon mixture being characterized by having a saponification value of over 400, a substantial difference between acid and saponification value, and prepared by liquid phase oxidation of hydrocarbons with oxygen of a free oxygen containing gas, which comprises reacting an oxidized hydrocarbon mixture of the aforesaid characteristics with an organic compound containing a hydroxyl group possessing alcoholic characteristics for a period of time sufficient to combine with saponifiable groups of said mixture an amount of said alcoholic compound in excess of the theoretical equivalent based on the acid value of said mixture, said reaction being carried out in the presence of an esterification catalyst capable of causing said reaction to continue beyond the extent of combining said alcoholic compound in an amount theoretically equivalent to the acid value of said mixture whereby a substantial portion of the saponifiable groups accounting for the difference between the acid and saponification values of said mixture are combined with said alcoholic compound.

2. A method, as defined in claim 1, wherein the catalyst is an acidic catalyst.

3. A method, as defined in claim 1, wherein the hydroxyl-containing compound is an alcohol.

4. A method, as defined in claim 1, wherein the hydroxyl-containing compound is an aliphatic monohydric alcohol.

5. An improved method for treatment of an oxidized hydrocarbon mixture, as defined hereinafter, to promote combination between a substantial portion of the saponifiable groups accounting for the difference between the acid and saponification values of said mixture with a monohydric aliphatic alcohol, said oxidized hydrocarbon mixture being characterized by having a saponification value of over 400, a substantial difference between acid and saponification value, and prepared by liquid phase oxidation of hydrocarbons with oxygen of a free oxygen containing gas, which comprises preparing a reaction mixture comprising an oxidized hydrocarbon mixture of the aforesaid characteristics and an amount of a monohydric alcohol substantially in excess of the theoretical equivalent based on the acid value of the oxidized hydrocarbon mixture, and heating said reaction mixture in the presence of an acidic catalyst while withdrawing water formed during reaction of the oxidized hydrocarbon with the alcohol to promote combination of said oxidized hydrocarbon with an amount of said alcohol in excess of the theoretical equivalent based on the acid value of the oxidized hydrocarbon mixture.

6. As a new composition, a reaction product formed by reaction of an organic compound containing a hydroxyl group possessing alcoholic characteristics with an oxidized hydrocarbon mixture having a saponification value of over 400, a substantial difference between the acid and saponification value, and prepared by liquid phase oxidation of hydrocarbons with oxygen of a free oxygen containing gas, said reaction product being characterized by containing saponifiable groups in combination with said hydroxyl-bearing compound and saponifiable groups that are not combined with said hydroxyl-bearing compound, said reaction product being further characterized in that the amount of saponifiable groups thereof combined with said hydroxyl-bearing compound is in excess of the theoretical equivalent based on the acid value of said oxidized hydrocarbon mixture.

7. An improved method for treatment of an oxidized hydrocarbon mixture as defined hereinafter to promote combination between a substantial portion of saponifiable groups accounting for the difference between the acid and saponification values of said oxidized hydrocarbon mixture with an organic compound containing a hydroxyl group possessing alcoholic characteristics, said oxidized hydrocarbon mixture being characterized by having a substantial difference between its acid and saponification value and prepared by contacting hydrocarbons in liquid phase at an oxidizing temperature with a gas containing free oxygen to combine oxygen with the hydrocarbons at an average rate related to the oxidizing temperature as follows: substantially above 1.5 liters of oxygen per hour per kilogram of hydrocarbons at an oxidizing temperature of 120° C., substantially above 23 liters of oxygen per hour per kilogram of hydrocarbons at an oxidizing temperature of 160° C., and substantially above 135 liters of oxygen per hour per kilogram of hydrocarbons at an oxidizing temperature of 180° C., which comprises reacting an oxidized hydrocarbon mixture of the aforesaid characteristics with an organic compound containing a hydroxyl group possessing alcoholic characteristics for a period of time sufficient to combine with said saponifiable groups of said mixture an amount of said alcoholic compound in excess of the theoretical equivalent based on the acid value of said mixture, said reaction being carried out in the presence of an esterification catalyst capable of causing said reaction to continue beyond the extent of combining said alcoholic compound in an amount theoretically equivalent to the acid value of said mixture whereby a substantial portion of the saponifiable groups accounting for the difference between the acid and saponification values of said mixture are combined with said alcoholic compound.

8. A method, as defined in claim 7, wherein the oxidized hydrocarbon mixture has a saponification value of over 400.

9. A method, as defined in claim 7, wherein the hydroxyl-bearing compound is an alcohol.

10. A method, as defined in claim 7, wherein the hydroxyl-bearing compound is an aliphatic monohydric alcohol.

11. A method, as defined in claim 7, wherein the catalyst is an acidic catalyst.

12. A reaction product, prepared by the method of claim 7, characterized by containing saponifiable groups combined with the hydroxyl-bearing compound and saponifiable groups uncombined with said compound, said reaction product being further characterized in that the amount of saponifiable groups combined with said hydroxyl-bearing compound is in excess of the saponifiable groups accounting for the acid value of the oxidized hydrocarbon mixture subjected to the treatment of claim 7.

13. An improved method for treatment of an oxidized hydrocarbon mixture as defined hereinafter to promote combination between a substantial portion of the saponifiable groups accounting for the difference between the acid and saponification value of said mixture with a monohydric aliphatic alcohol, said oxidized hydrocarbon mixture being characterized by having a saponification value of over 400, a substantial difference between its acid and saponification value, and prepared by contacting hydrocarbons in liquid phase at an oxidizing temperature with a gas containing free oxygen to combine oxygen with the hydrocarbons at an average rate related to the oxidizing temperature as follows: substantially above 1.5 liters of oxygen per hour per kilogram of hydrocarbons at an oxidizing temperature of 120° C., substantially above 23 liters of oxygen per hour per kilogram of hydrocarbons at an oxidizing temperature of 160° C., and substantially above 135 liters of oxygen per hour per kilogram of hydrocarbons at an oxidizing temperature of 180° C., which comprises preparing a reaction mixture comprising said oxidized hydrocarbons and a monohydric aliphatic alcohol in an amount substantially in excess of the theoretical equivalent based on the acid value of the oxidized hydrocarbon, and heating said reaction mixture in the presence of an acidic catalyst while withdrawing water formed by reaction of the oxidized hydrocarbon with the alcohol to promote reaction between said oxidized hydrocarbon and an amount of alcohol in excess of the theoretical equivalent based on the acid value of the oxidized hydrocarbon mixture.

14. A method, as defined in claim 13, wherein the reaction product is subjected to fractional distillation.

15. A method for treatment of an oxidized hydrocarbon mixture as defined hereinafter to improve the susceptibility thereof to treatment by distillation with improved recovery of saponifiable equivalents in distillate form, said oxidized hydrocarbon being characterized by having a saponification value of over 400, a substantial difference between acid and saponification value, and prepared by liquid phase oxidation by hydrocarbons with oxygen of a free oxygen containing gas, which comprises preparing a reaction mixture containing an oxidized hydrocarbon of the aforesaid characteristics and an organic compound containing a hydroxyl group possessing alcoholic characteristics and heating said reaction mixture in the presence of an esterification catalyst capable of causing said reaction to continue until saponofiable groups of said mixture have combined with an amount of said alcoholic compound in excess of the theoretical equivalent based on the acid value of said mixture.

16. An improved method for treatment of an oxidized hydrocarbon mixture as defined hereinafter to promote combination between a substantial portion of the saponifiable groups accounting for the difference between the acid and saponification value of said mixture with an organic compound containing a hydroxyl group possessing alcoholic characteristics, said oxidized hydrocarbon mixture being characterized by having a saponification value of over 400, a substantial difference between acid and saponification value, and prepared by liquid phase oxidation of hydrocarbon with oxygen of a free oxygen containing gas, which comprises reacting an oxidized hydrocarbon mixture of the aforesaid characteristics with an organic compound containing a hydroxyl group possessing alcoholic characteristics to combine with said oxidized hydrocarbon an amount of said hydroxyl-bearing compound theoretically equivalent to a substantial portion of the acid value of said oxidized hydrocarbon mixture and then continuing to react the product of the aforesaid reaction with a hydroxyl-bearing compound as aforesaid in the presence of an esterification catalyst capable of causing said reaction to continue beyond the extent of combining the alcoholic compound in an amount theoretically equivalent to the acid value of said mixture and combine with said alcoholic compound a substantial portion of the saponifiable groups accounting for the difference between the acid and saponification values of said mixture to produce an oxidized hydrocarbon mixture having a substantial portion of its saponifiable groups accounting for the difference between its acid and saponification value in combination with said hydroxyl-bearing compound.

17. A method, as defined in claim 1, wherein the oxidized hydrocarbon mixture had been prepared by oxidation of a predominantly paraffinic hydrocarbon mixture, the organic compound is a monohydric aliphatic alcohol, and the catalyst is an acidic catalyst.

18. A method, as defined in claim 17, wherein the catalyst is a member from the group consisting of sulfuric acid, hydrochloric acid, toluene sulfonic acid, zinc chloride and boron trifluoride etherate.

19. A method, as defined in claim 7, wherein the catalyst is an acidic catalyst, the organic compound is a monohydric aliphatic alcohol, and the oxidized hydrocarbon mixture had been prepared by oxidation of a predominantly paraffinic hydrocarbon mixture.

20. As a new composition, a reaction product formed by reaction of an aliphatic monohydric alcohol with an oxidized hydrocarbon mixture having a saponification value of over 400, a substantial difference between the acid and saponification value, and prepared by liquid phase oxidation of a predominantly paraffinic hydrocarbon mixture with oxygen of a free oxygen-containing gas, said reaction product being characterized by containing saponifiable groups in combination with said alcohol and saponifiable groups that are not combined with said alcohol, said reaction product being further characterized in that the amount of saponifiable groups thereof combined with said alcohol is in excess of the theoretical equivalent based on the acid value of said oxidized hydrocarbon mixture.

CARL N. ZELLNER.
FRED LISTER.

REFERENCES CITED

The following references are of record in the file of this patent:

UNITED STATES PATENTS

| Number | Name | Date |
|---|---|---|
| 2,054,979 | Jahrstorfer et al. | Sept. 22, 1936 |